US007693225B2

(12) United States Patent
Lin et al.

(10) Patent No.: US 7,693,225 B2
(45) Date of Patent: Apr. 6, 2010

(54) INTER-SYMBOL AND INTER-CARRIER INTERFERENCE CANCELLER FOR MULTI-CARRIER MODULATION RECEIVERS

(75) Inventors: Chia-Liang Lin, Union City, CA (US); Heng-Cheng Yeh, Taipei (TW); Cheng-Hsian Li, Baoshan Shiang (TW)

(73) Assignee: Realtek Semiconductor Corp. (TW)

( * ) Notice: Subject to any disclaimer, the term of this patent is extended or adjusted under 35 U.S.C. 154(b) by 870 days.

(21) Appl. No.: 11/256,707

(22) Filed: Oct. 24, 2005

(65) Prior Publication Data

US 2007/0019746 A1    Jan. 25, 2007

Related U.S. Application Data

(60) Provisional application No. 60/595,621, filed on Jul. 21, 2005.

(51) Int. Cl.
*H04K 1/10* (2006.01)

(52) U.S. Cl. .................. 375/260; 375/229; 375/346; 375/222; 375/344; 455/296; 455/130; 455/283; 370/342; 370/208; 370/210

(58) Field of Classification Search .................. 375/260, 375/229, 346, 344, 262, 222; 370/342, 208, 370/210, 350; 455/296, 130, 283
See application file for complete search history.

(56) References Cited

U.S. PATENT DOCUMENTS 6,014,412 A * 1/2000 Wiese et al. ................ 375/346

(Continued)

OTHER PUBLICATIONS

Arslan, G. , et al., "Equalization for Discrete Multitone Transceivers to Maximize Bit Rate", *IEEE Transaactions on Signal Processing*, vol. 49, No. 12,(Dec. 12, 2001),3123-3135.

(Continued)

*Primary Examiner*—Chieh M Fan
*Assistant Examiner*—Eva Y Puente
(74) *Attorney, Agent, or Firm*—Schwegman, Lundberg & Woessner, P.A.

(57) ABSTRACT

A MCM (multi-carrier modulation) receiver that utilizes a plurality tones to transmit information. Identify a first subset of tones that have negligible ISI (inter-symbol interference) and ICI (inter-carrier interference), and a second subset of tones that ISI/ICI cancellation is needed to improve the performance. For tones in the first subset, conventional FEQ (frequency-domain equalization) is performed to obtained soft decisions from the raw decisions. For those tones in the second subset, perform FEQ along with ICI/ISI cancellation. For tones in the second subset, identify a third subset (one for each of the tones in the second subset) to perform ICI cancellation and a series of fourth subsets (one for each of the tones in the second subset) to perform ISI cancellation. The selection of the first subset, the second subset, the third subset (for each of the tone in the second subset), and the fourth subset (for each of the tone in the second subset) are based on examining the frequency response of the communication channel.

22 Claims, 8 Drawing Sheets

U.S. PATENT DOCUMENTS

| | | | |
|---|---|---|---|
| 6,130,922 A * | 10/2000 | Stott et al. | 375/344 |
| 6,243,414 B1 | 6/2001 | Drucker et al. | |
| 6,389,062 B1 * | 5/2002 | Wu | 375/222 |
| 6,999,508 B1 * | 2/2006 | Redfern | 375/229 |
| 2003/0067865 A1 | 4/2003 | Gross et al. | |
| 2004/0264587 A1 | 12/2004 | Morejon et al. | |
| 2005/0084005 A1 | 4/2005 | Mujica et al. | |
| 2006/0153283 A1 | 7/2006 | Scharf et al. | |
| 2007/0053453 A1 * | 3/2007 | Yeh et al. | 375/260 |

OTHER PUBLICATIONS

Yeh, Heng-Cheng, et al., "Frequency Domain Echo Cancellation for Discrete Multitone Systems", *ISSPIT-IEEE*, Rome, (Dec. 2004), 4 pages.

Trautmann, S., et al., "Frequency Domain Equalization of DMT/OFDM Systems", *IEEE*, #0-7803-7400-2/02, (2002), 1646-1650.

Wolf, Martin J., et al., "A New Phenomenon Observed in Conection with Determining the FEQ of DMT Transceivers with Insufficient Guard Interval", *IEEE*, 0-7803-8379-6/04/$20.00, (2004), 389-392.

* cited by examiner

PRIOR ART DMT TRANSMITTER

PRIOR ART DMT RECEIVER

DUAL PATH TEQ ARCHITECTURE (PRIOR ART)

PTFEQ ARCHITECTURE (PRIOR ART)

EXEMPLARY DMT RECEIVER IN ACCORDANCE WITH
EMBODIMENTS OF THE PRESENT INVENTION

FUNCTIONAL BLOCK DIAGRAM OF THE FEQ/IC/SLICER

FIG. 8 FUNCTIONAL DESCRIPTION OF FEQ/IC

INTER-SYMBOL AND INTER-CARRIER INTERFERENCE CANCELLER FOR MULTI-CARRIER MODULATION RECEIVERS

CROSS-REFERENCE TO RELATED PATENT APPLICATION

This patent application claims the benefit under Title 35, United States Code, section 119(e), of U.S. Provisional Patent Application Ser. No. 60/595,621 filed Jul. 21, 2005, titled "Inter-Symbol and Inter-Carrier Interference Canceller for Multi-Carrier Modulation Receiver," by inventors Chia-Liang Lin, Heng-Cheng Yeh and Cheng-Hsian Li, the entire subject matter of which is incorporated herein by reference.

COPYRIGHT NOTICE

This patent document contains copyrightable subject matter that may include (by way of example and not by way of limitation) computer software elements, source code, flow charts, screen displays, and other copyrightable subject matter. The following notice shall apply to these elements: Copyright© 2005 Real Communications, Inc., San Jose, Calif. All rights reserved.

LIMITED WAIVER OF COPYRIGHT

In accordance with 37 CFR section 1.71(e), a portion of the disclosure of this patent document may contain material to which a claim for copyright is made. The copyright owner has no objection to the facsimile reproduction by anyone of the patent document or the patent disclosure as it appears in the United States Patent and Trademark Office patent file or records, as long as the above Copyright Notice remains legible on all copies. The copyright owner reserves all other national and international copyright rights.

BACKGROUND OF THE INVENTION

1. Field of the Invention

The present invention relates to multi-carrier modulation receivers, in particular to a method of canceling the inter-symbol and inter-carrier interface in a multi-carrier modulation receiver.

2. Description of Related Art

MCM (multi-carrier modulation) is a modulation scheme that is widely used in high-speed data communications. It has two flavors: OFDM (orthogonal frequency division multiplexing), which is currently used in wireless local area network standards IEEE 802.11a and 802.11g, and DMT (discrete multi-tone), which is currently used in ADSL (asymmetrical digital subscriber line) standards. While the DMT system is discussed throughout the specification and is used as an example, one of ordinary skill in the art will realize that the techniques disclosed by the present invention are applicable to a general MCM system.

A DMT transmitter utilizes a plurality of tones, (or so-called sub-carriers, which are sinusoidal waves), which are orthogonal to one another. Each tone may carry a certain bit-load of information using a certain modulation scheme, such as 4-QAM (4-point quadrature amplitude modulation, which carries 2-bit information), 16-QAM (16-point quadrature amplitude modulation, which carries 4-bit information), 64-QAM (64-point quadrature amplitude modulation, which carries 6-bit information), and so on. The total bit loads provided by all the tones determines the total number of data bits that a DMT symbol carries. For example, if there are 255 tones and each of them uses 16-QAM, then the total amount of data a DMT symbol carries is 255×4=1020 bits. A DMT transmission system thus operates on a per-frame basis. Each frame consists of a block of data bit stream whose length is equal to the total number of bits that a DMT symbol carries. For example, if each DMT symbol carries 1020 bits, then the data to be transmitted from the transmitter are divided into many blocks; each block has 1020 bits and is carried by a DMT symbol.

FIG. 1 depicts a typical block diagram of the physical layer implementation of a DMT transmitter 1000. A SIPO (serial-in parallel-out) buffer 1100 converts a block of data bit stream (that a DMT symbol carries) into N parallel data banks, labeled 0, 1, 2, to N−1. Each entry of the N banks is mapped into a respective QAM (quadrature amplitude modulation) constellation point by the subsequent QAM mapper 1200, resulting in Ncomplex (frequency domain) data, labeled 0, 1, 2, to N−1. A constellation diagram is a representation of a digital modulation scheme in the complex plane. The points on a constellation diagram are called constellation points. Constellation points are a set of modulation symbols that comprise a modulation alphabet.

For example, if tone number 5 uses 4-QAM to carry two bits of information, the QAM mapper 1200 will map the two-bit input corresponding to tone number 5 into one of the four constellation points: 1+j, 1−j, −1+j, −1−j. The N complex data from QAM mapper 1200 are converted into N time-domain samples by N-point IFFT (inverse Fast Fourier Transform) 1300. The last N_CP time-domain samples of the IFFT output are pre-pended to the beginning of the N samples, resulting in N+N_CP time-domain samples, labeled 0, 1, 2, to N+N_CP−1. These N_CP pre-pended samples are referred to as "cyclic prefix" (CP) of the corresponding IFFT frame. A subsequent PISO (parallel-in serial-out) buffer 1500 converts the N+N_CP time domain samples into N+N_CP serial samples, which is converted into analog voltage by a DAC (digital-analog converter) 1600. An amplifier 1700 amplifies the output from DAC 1600 to make it suitable for transmission over the communication medium 2020 (for example, telephone lines). The N+N_CP serial samples constitute a DMT symbol that carries a certain block of information.

FIG. 2 illustrates the construction of two successive DMT symbols. The last N_CP samples of the IFFT output corresponding to the first block of data bit stream are pre-pended to the beginning of the first DMT symbol. Similarly, the last N_CP samples of the IFFT output corresponding to the second block of data bit stream are pre-pended to the beginning of the second DMT symbol. "Cyclic prefix" carries redundant information that is readily available. However, it provides a "guard interval" that serves as a buffer between two successive DMT symbols. Without the guard interval, the information carried by the $1^{st}$ DMT symbol will leak to the $2^{nd}$ DMT symbol and causes interference when the two successive DMT symbols are transmitted over the communication channel 2020, since every practical communication channel has a non-zero length in its impulse response. When we employ a CP whose length is longer than the impulse response of the communication channel, the leakage of the information carried by the first DMT symbol will be contained within the guard interval between the two DMT symbols. The CP, however, is an overhead to the system. A longer CP allows the system to tolerate more dispersion from the communication channel at the cost of a lower data throughput.

FIG. 3 depicts a typical block diagram of a DMT receiver. The received signal from the communication medium 2020 is amplified by an amplifier 2050, then filtered by a filter 2100, and then converted into digital samples by a ADC (analog-digital converter) 2200. As mentioned above, the cyclic prefix in the transmitter needs to be longer then the length of the impulse response of the communication channel 2020 for the leakage of information from one DMT symbol to be contained within the guard interval. In practice, however, the impulse response of the communication channel may be longer than the CP because the CP is usually not long enough (otherwise the sacrifice in data throughput will be prohibitively high). Therefore, a TEQ 2300 (time-domain equalizer) is often used. TEQ 2300 is essentially a FIR (finite impulse response) filter whose purpose is to effectively shorten the impulse response of the communication channel, so that the leakage of the information from one DMT symbol can be contained within the guard interval.

From the output of the TEQ 2300, the frame boundary between two successive DMT symbols is detected. The output of TEQ 2300 is then converted by a SIPO (serial-in parallel-out) 2400 into successive blocks of time domain samples; each block consists of N+N_CP time-domain samples, labeled 0, 1, 2, . . . , N+N_CP−1. The $1^{st}$ N_CP samples of each frame, which corresponds to the samples within the guard interval, are discarded in the subsequent CP removal 2500, resulting in N samples, labeled 0, 1, 2, to N−1. The N time-domain samples are transformed into N frequency-domain samples by the N-point FFT (fast Fourier transform) 2600.

Ideally, we would like the N frequency-domain samples at the output of FFT 2600 to exactly match the N frequency-domain data at the input of IFFT 1300 in the transmitter depicted by FIG. 1. Unfortunately, due to the communication channel, the amplitude and phase of each sub-carrier is altered and therefore the frequency domain sample at the receiver will not exactly match that at the transmitter. A FEQ (frequency domain equalizer) 2700 is used to equalize the frequency-domain samples. The amplitude and phase change experienced by each tone is thus corrected independently on a per-tone basis. After frequency domain equalization, a slicer 2750 is used to decide the most likely constellation point that the transmitter originally uses for each tone. For example, if the output of FEQ 2700 is 0.9+1.1j for tone number 5 which uses 4-QAM to carry two-bit information, then slicer 2750 would decide that the most likely constellation point that the transmitter originally uses for tone number 5 is 1+1j. The slicer is an example embodiment of a "decision device," as it makes a most likely decision for each tone. The output from slicer 2750 is mapped to N data banks by the subsequent "QAM demapper" 2800. The N data banks from "QAM demapper" 2800 are converted back into a block of data bit stream by PISO 2900, which ideally will match that of the input of SIPO 1100 in the transmitter.

To effectively shorten the length of the effective impulse response of the communication channel, many algorithms for calculating the coefficients for TEQ are proposed, including minimum mean square error (MMSE), maximum shortening SNR (MSSNR), minimum ISI (mini-ISI), and maximum bit rate (MBR). Among these, MBR offers the best performance, but the computation complexity is too high to be implemented in a commercial MCM receiver. In many cases, unfortunately, none of the algorithms are able to lead to a practical solution that completely contains the leakage of the information from a DMT symbol within the guard interval (i.e. CP of the next DMT symbol). Under these circumstances, a DMT symbol causes interference to the next DMT symbol. This phenomenon is known as "inter-symbol interference" (ISI).

When the length of impulse response of the communication channel exceeds the CP length, a DMT symbol will fail to settle into steady state within its guard interval (i.e. the CP portion of this DMT symbol). In other words, there is still some transient behavior within the "useful" part, i.e. the last N samples, of the DMT symbol. DMT modulation, as a special of MCM, relies on the orthogonality of carriers to faithfully deliver the information. The orthogonality between two tones holds only when they are both in steady state, where both become purely sinusoidal. Whenever the DMT symbol fails to settle into steady state within its guard interval, the orthogonality among tones used by this DMT symbol fails. There is then coupling between the information carried by any two tones that it uses. This phenomenon is known as "inter-carrier interference" (ICI).

One way to alleviate the ISI/ICI problem is to employ multiple TEQ's (time-domain equalizers). For example, a dual-TEQ architecture is shown in FIG. 4. This receiver divides the tones into two groups and employs TEQ1 and TEQ2. Each TEQ is optimized to minimize the ISI/ICI for one group of tones. Each TEQ output is converted into frequency domain samples in a respective FFT. On a per-tone basis, this receiver determines which output of the two paths yields the best SNR (signal-noise ratio). Once the better path for each tone is determined, the output from the path is equalized by the subsequent FEQ. A drawback for this type of receiver is that the hardware cost of this architecture is rather high.

Another way to alleviate the ISI/ICI problem is to employ a so-called "per-tone frequency domain equalizer" (PTFEQ), as shown in FIG. 5. The principle in this design is to eliminate TEQ by replacing it with a plurality of tapped delay lines 5010 in the frequency domain at the FFT output. The hardware cost, however, is prohibitively high for a commercial MCM receiver.

What is needed is a low-cost, robust, and effective scheme for performing ISI/ICI cancellation.

SUMMARY OF THE INVENTION

The present invention includes methods, devices and systems for minimizing or canceling inter-symbol and inter-carrier interface in multi-carrier modulation (MCM) receivers that utilize a plurality tones to transmit information. In an embodiment of the present invention, a first subset of tones that have negligible ISI (inter-symbol interference) and ICI (inter-carrier interference) is identified, and a second subset of tones that ISI/ICI cancellation is needed to improve the performance is identified. For tones in the first subset, conventional FEQ (frequency-domain equalization) is performed to obtained soft decisions from raw decisions. For tones in the second subset, we perform FEQ along with ICI/ISI cancellation. For tones in the second subset, a third subset (one for each of the tones in the second subset) is identified to perform ICI cancellation and a series of fourth subsets (one for each of the tones in the second subset) to perform ISI cancellation.

In embodiments of the present invention, the selection of the first subset, the second subset, the third subset (for each of the tone in the second subset), and the fourth subset (for each of the tone in the second subset) are based on examining the frequency response of the communication channel. The first subset usually consists of the tones residing in the frequency range where the response of the communication channel varies smoothly with frequency. The second subset consists of tones that are usually in the proximity of abrupt transition in the frequency response of the communication channel. For each tone in the second subset, the third subset (for each of the tones in the second subset) includes its image tone, a few neighboring tones along with their images, and a few empty tones along with their images. For each tone in the second subset, the fourth subset (for each of the tones in the second subset) includes the tone itself along with its image, a few neighboring tones along with their images, and a few empty tones along with their images. The FEQ/IC coefficients for each tone are obtained by minimizing the root mean square error between the hard decision and the soft decision of that particular tone.

These and other embodiments, aspects, advantages, and features of the present invention, as well as various methods for producing, forming, and assembling the devices, circuitry, apparatus, and systems described, will be set forth in the detailed description which follows. Other aspects and features will also become apparent to those skilled in the art after due study of the drawings included herein, and a review of the detailed description, as well as by the practice of the invention. Such aspects, advantages, and features of the invention are realized and attained by exercising the instrumentalities, procedures, and combinations particularly pointed out in the appended claims.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration. While the specification described several example embodiments of the invention considered best modes of practicing the invention, it should be understood that the invention can be implemented in many ways and is not limited to the particular examples described below or to the particular manner in which any features of such examples are implemented.

The present invention relates to a scheme of canceling the ISI/ICI for a MCM receiver. While the specification described several example embodiments of the invention considered best modes of practicing the invention, it should be understood that the invention can be implemented in many ways and is not limited to the particular examples described below or to the particular manner in which any features of such examples are implemented.

Figure 1:
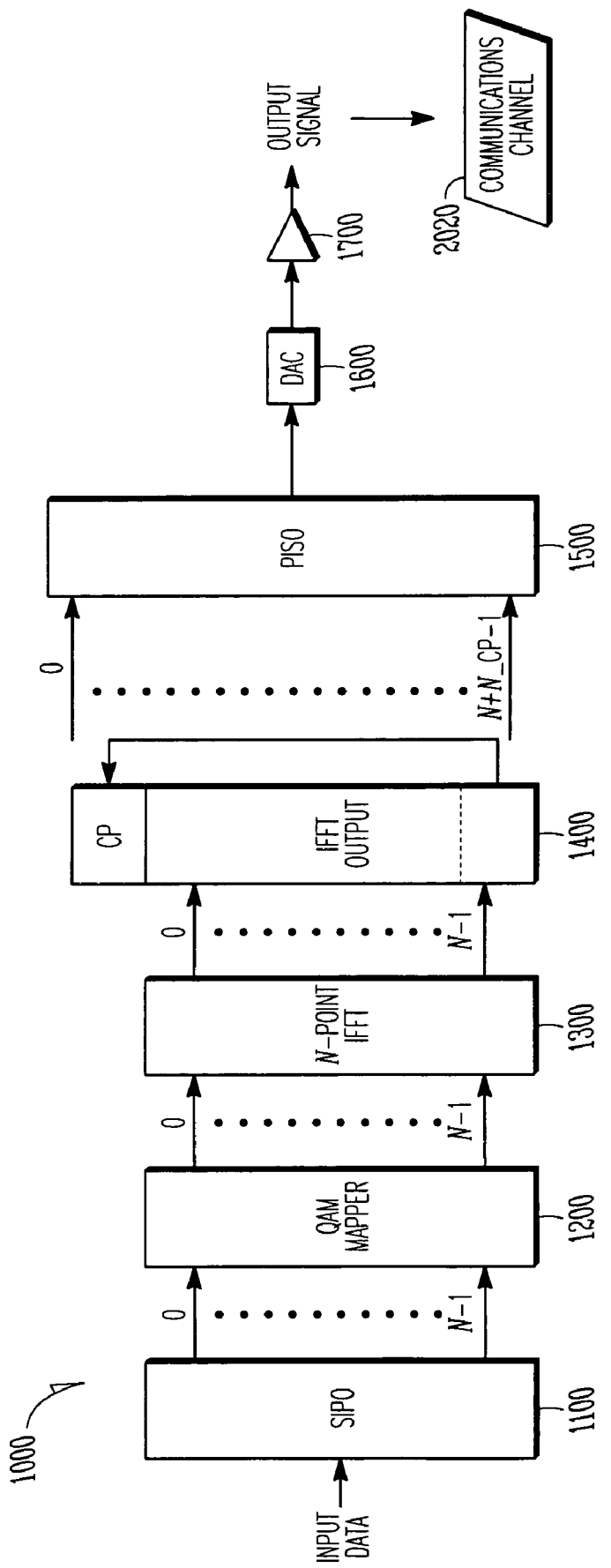
FIG. 1 is a block diagram of a prior art Discrete Multi-Tone (DMT) transmitter.
Figure 2:
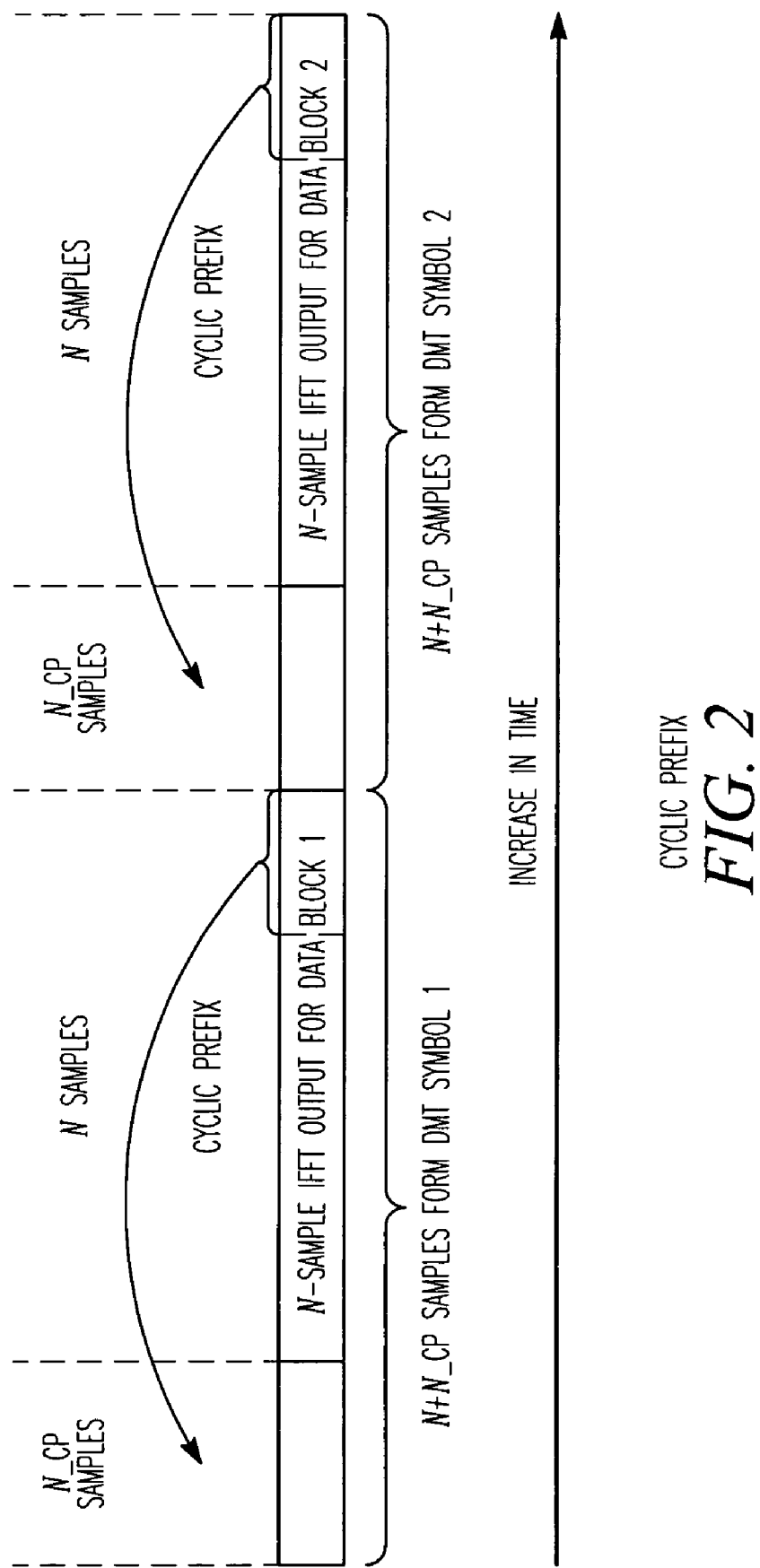
FIG. 2 illustrates a two successive DMT symbols.
Figure 3:
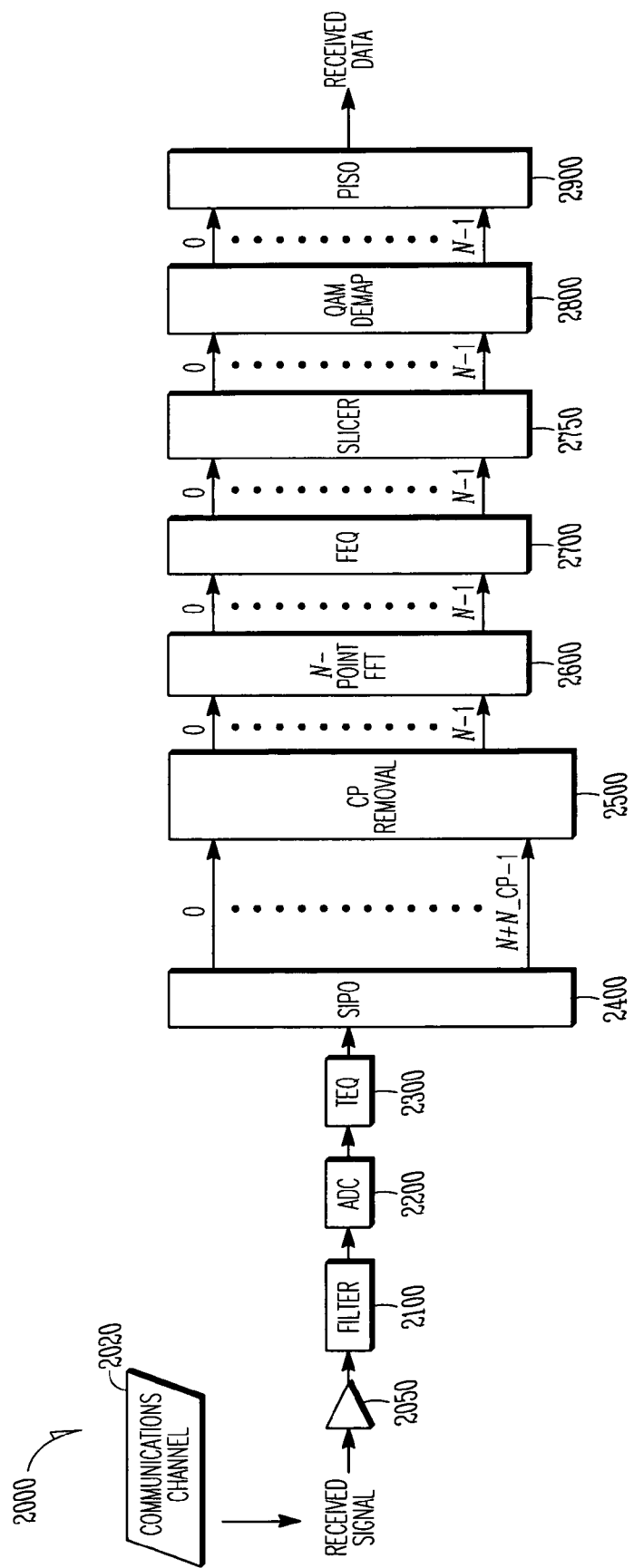
FIG. 3 is a block diagram of a prior art DMT receiver.
Figure 4:
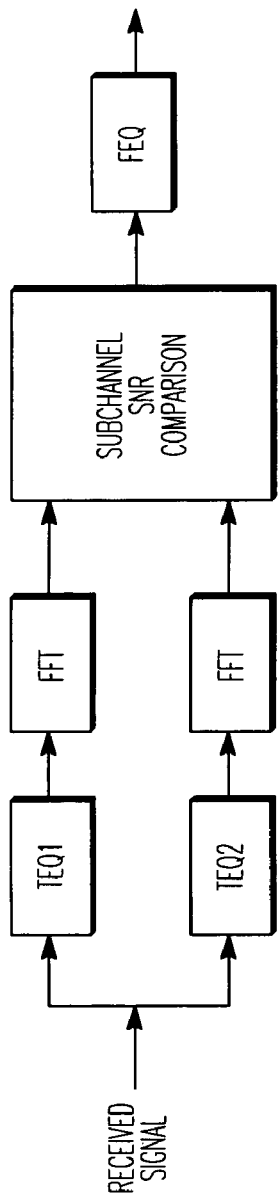
FIG. 4 is a block diagram of a prior art dual-path Time-domain Equalizer (TEQ) architecture.
Figure 5:
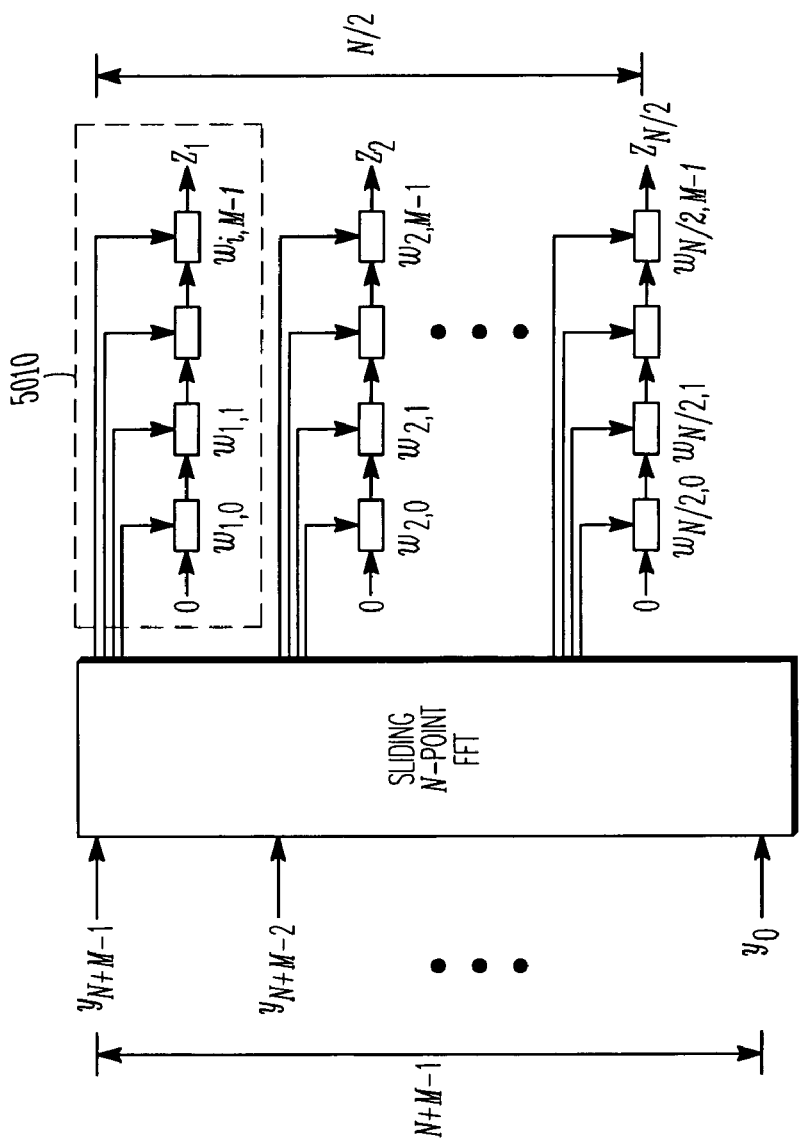
FIG. 5 is a block diagram of a prior art Per-Tone Frequency Domain Equalizer (PTFEQ) architecture.

Let the effective impulse response of the communication channel 2020 (including the path from the output of PISO 1500 in FIG. 1 to the input of FFT 2600 of the receiver in FIGS. 3 and 6) be represented by a FIR (finite impulse response) filter which has $L_p$-taps of precursor and $L_c$-taps of post-cursor. Mathematically, we may write the effective impulse response as:

$$c = [c_{-L_p} \ldots c_{-2}\, c_{-1}\, c_0\, c_1\, c_2 \ldots \ldots c_{L_c}]^T$$

On the receiver side, a DMT symbol will be affected by its preceding symbol due to the post-cursor (of the effective impulse response), and also by its subsequent symbol due to the precursor. Usually, the precursor is relatively short and low in total energy and thus can be neglected. By artificially adjusting the symbol boundary, the effect of the precursor can be contained within the guard interval and thus will not cause interference to the preceding symbol. In accordance with some embodiments of the present invention, we use the information in current DMT symbol and that in the preceding symbol to remove the detrimental effects of ISI/ICI.

Figure 6:
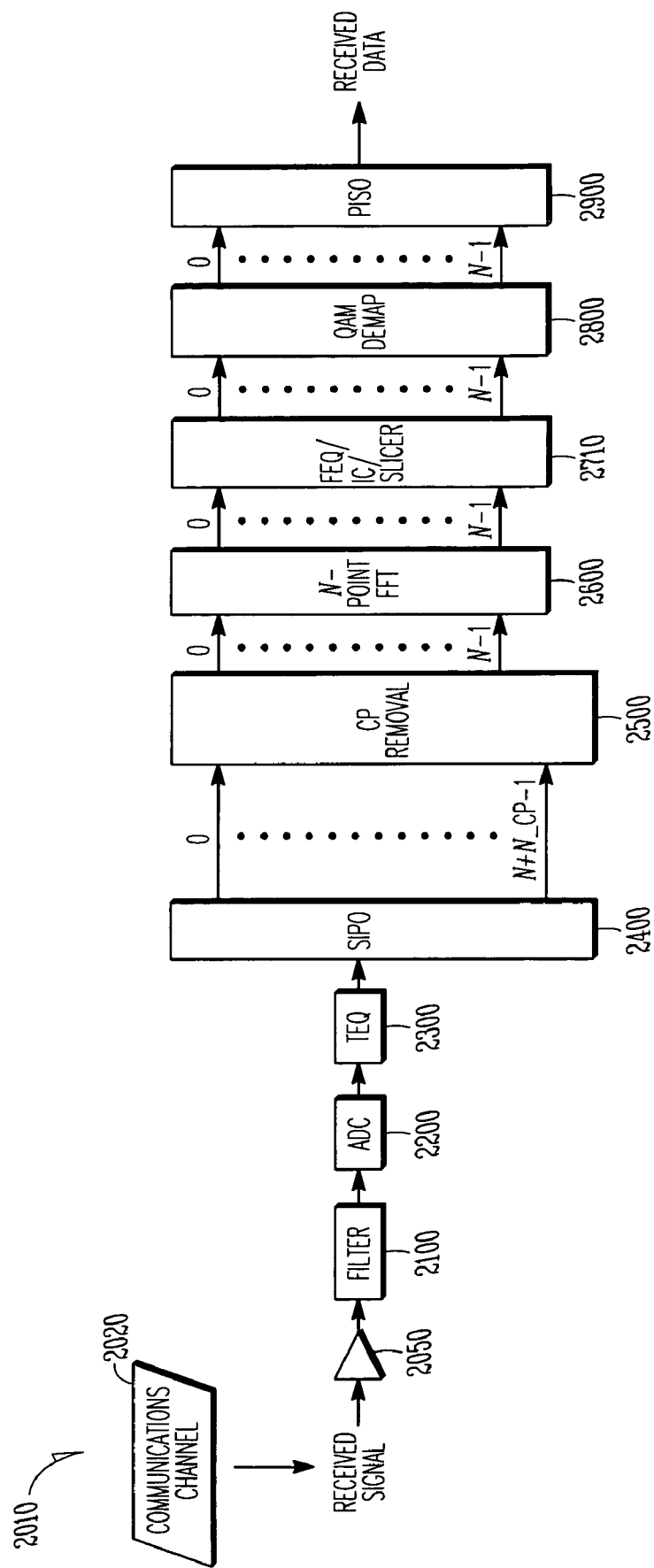
FIG. 6 is a block diagram of an exemplary embodiment of the present invention of implementing a Frequency-domain Equalizer/Interference Canceller/slicer (FEQ/IC/slicer) included in a DMT receiver.

FIG. 6 is a block diagram of an exemplary Discrete Multi-Tone (DMT) Receiver 2010 in accordance with various embodiments of the present invention. It is the same general architecture as the prior art receiver shown in FIG. 3 except that the FEQ 2700 and slicer 2750 are replaced by FEQ/IC/slicer (frequency domain equalizer/interference canceller/slicer) 2710.

Figure 7:
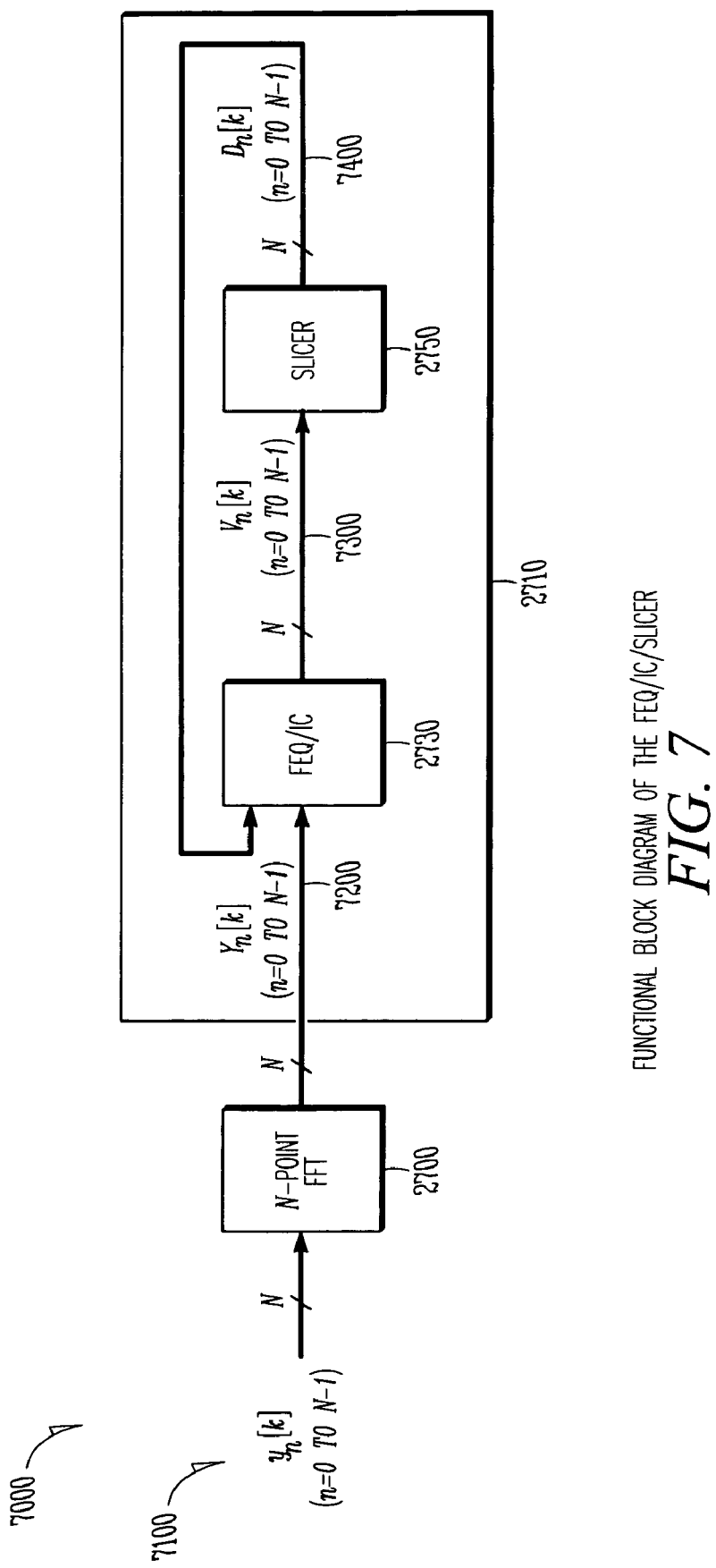
FIG. 7 is a block diagram illustrating an exemplary embodiment of an FEQ/IC/slicer.

FIG. 7 shows an exemplary top-level functional block diagram 7000 of FEQ/IC/Slicer 2710, including FEQ/IC block 2730 and slicer 2750. In FIG. 7, $y_n[k]$ (for n=0 to N−1) represent N time-domain samples 7100 for DMT symbol k, where k=1 corresponds to the first DMT symbol, k=2 corresponds to the second DMT symbol, and so on. The N-point FFT 2700 transforms the time domain samples $y_n[k]$ into frequency domain samples $Y_n[k]$ (for n=0 to N−1), labeled as 7200, which are referred to as "raw decisions" $Y_n[k]$. FEQ/IC block 2730 processes frequency domain samples 7200 to produce output $V_n[k]$ (for n=0 to N−1), which are referred to as "soft decisions" 7300. Further detail regarding the processing within FEQ/IC block 2730 is described below in connection with FIGS. 8 and 9.

Referring once again to FIG. 7, the soft decisions 7300 are applied to slicer 2750. As described above, slicer (or decision device) 2750 determines the most likely constellation point for each tone and generates outputs $D_n[k]$ (for n=0 to N−1) which are referred to as "hard decisions" 7400. The hard decisions from slicer 2750 are provided to QAM demapper 2800, as shown in FIG. 6. Returning to FIG. 7, in some embodiments, hard decisions $D_n[k]$ (for n=0 to N−1), labeled 7400, are fed back into the FEQ/IC block 2730, wherein the fed back hard decisions 7400 are used to remove interference of the DMT symbol k or in subsequent symbols.

Figure 8:
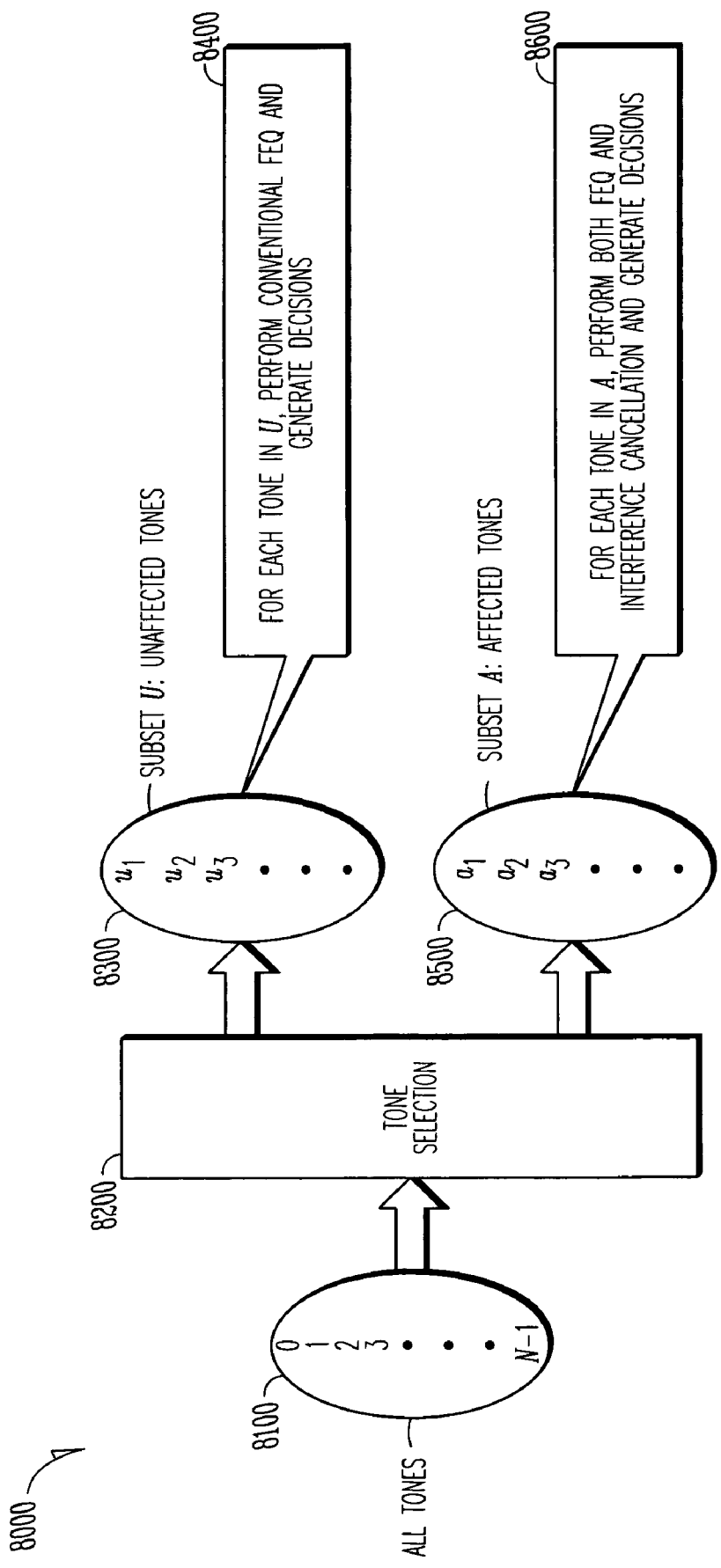
FIG. 8 illustrates a functional diagram of an exemplary FEQ/IC block according to some embodiments of the present invention.

FIG. 8 show an exemplary functional description of an FEQ/IC block 8000 used in embodiments of the present invention. In FIG. 8, all tones in a particular DMT symbol are shown at block 8100. These tones are indicated as 0, 1, 2, 3, . . . N−1. All tones in block 8100 are supplied to tone selection block 8200 where tone selection block 8200 selects a first subset of tones 8300 and a second subset of tones 8500 (described more fully below). The first subset of tones 8300 are identified as a list of tones of interest having negligible ISI and ICI. The indices of these tones form a subset U for unaffected tones, where $U=\{u_1, u_2, u_3, \ldots\}$. For each tone in the first subset of tones 8300, conventional FEQ is used to compensate the amplitude and phase change caused by transmission of the tones over the communication channel 2020. Mathematically, the following expression is used to describe the FEQ operation performed on the first subset of tones 8300:

$$V_n[k] = Y_n[k] \cdot F_n^*, \text{ for } n \in U \quad \text{Equation 1}$$

In equation 1, $V_n[k]$ represents the soft decisions 7300, $Y_n[k]$ represents the raw decisions 7200 provided to FEQ/IC block, and $F_n$ is a complex scaling factor, which is also the coefficient of the conventional FEQ for tone n, and "*" denotes complex conjugate. This mathematical expression can be rephrased in English as meaning that the "soft decision" for tone n in subset U, which contains the tones of interest that have negligible ISI/ICI, is obtained by calculating the dot product between the "raw decision" and the FEQ coefficient of tone n.

Returning to FIG. 8, tone selection block 8200 also selects a second subset of tones 8500 which suffer from significant ISI/ICI. The second subset of tones 8500 are identified as a list of tones of interest having significant ISI and ICI and the indices of these tones form a subset A for affected tones, where $A=\{a_1, a_2, a_3, \ldots\}$. For each tone in the second subset of tones conventional FEQ is performed at block 8600 to compensate the amplitude and phase change caused by transmission of the tones over the communication channel.

In various embodiments, a third subset of tones is selected from the current DMT symbol, the current DMT symbol being the symbol providing the all tones in block 8100. The third subset of tones is used in performing ICI cancellation on the second subset of tones 8500. In various embodiments, a fourth subset of tones is selected from a previous DMT symbol, the previous DMT symbol including a DMT symbol previously received and processed by the FEQ/IC block. The fourth subset of tones is used in performing ISI cancellation on the second subset of tones 8500. In this regard, the indices of tones involved in ICI cancellation for tone n in A form the third subset M(n), and the indices of tones involved in ISI cancellation for tone n in A form a fourth subset P(n). Mathematically, we use the following expression to describe the FEQ/IC operation:

$$V_n[k] = Y_n[k] \cdot F_n^* - \sum_{m \in M(n)} Y_m[k] \cdot C_{nm}^* - \sum_{p \in P(n)} D_p[k-1] \cdot S_{np}^*, \quad \text{Equation 2}$$

for $n \in A$

Wherein for Equation 2, $V_n[k]$ are the "soft decisions" for tone n in the subset A. $Y_n[k]$ is the "raw decision" provided to the FEQ/IC block, $F_n$ is a complex scaling factor, which is also the coefficient of the conventional FEQ for tone n, and "*" denotes complex conjugate, and wherein the indices of tones involved in ICI cancellation for tone n in A form a subset M(n), consisting of culprit tones that cause non-negligible ICI to tone n, and the indices of tones involved in ISI cancellation for tone n in A form a subset P(n), consisting of culprit tones that cause non-negligible ISI to tone n. Here, $F_n$ is a complex scaling factor, which is similar to the coefficient of the conventional FEQ for tone n; $C_{nm}$ is a coupling coefficient between tone m of current DMT symbol and tone n of current DMT symbol; $S_{np}$ is a coupling coefficient between tone p of previous DMT symbol and tone n of current DMT symbol; also, "*" denotes complex conjugate. This mathematical expression can be rephrased in English as meaning that the "soft decision" for tone n in subset A, which contains the tones of interest that have non-negligible ISI/ICI is obtained by calculating the dot product between the "raw decision" and the FEQ coefficient of tone n, minus the dot product between the vector formed by the "raw decisions" corresponding to the tones in subset M(n) and an ICI vector, minus the dot product between the vector formed by the "hard decisions" corresponding to the tones in subset P(n) from the previous DMT symbol and an ISI vector.

Figure 9:
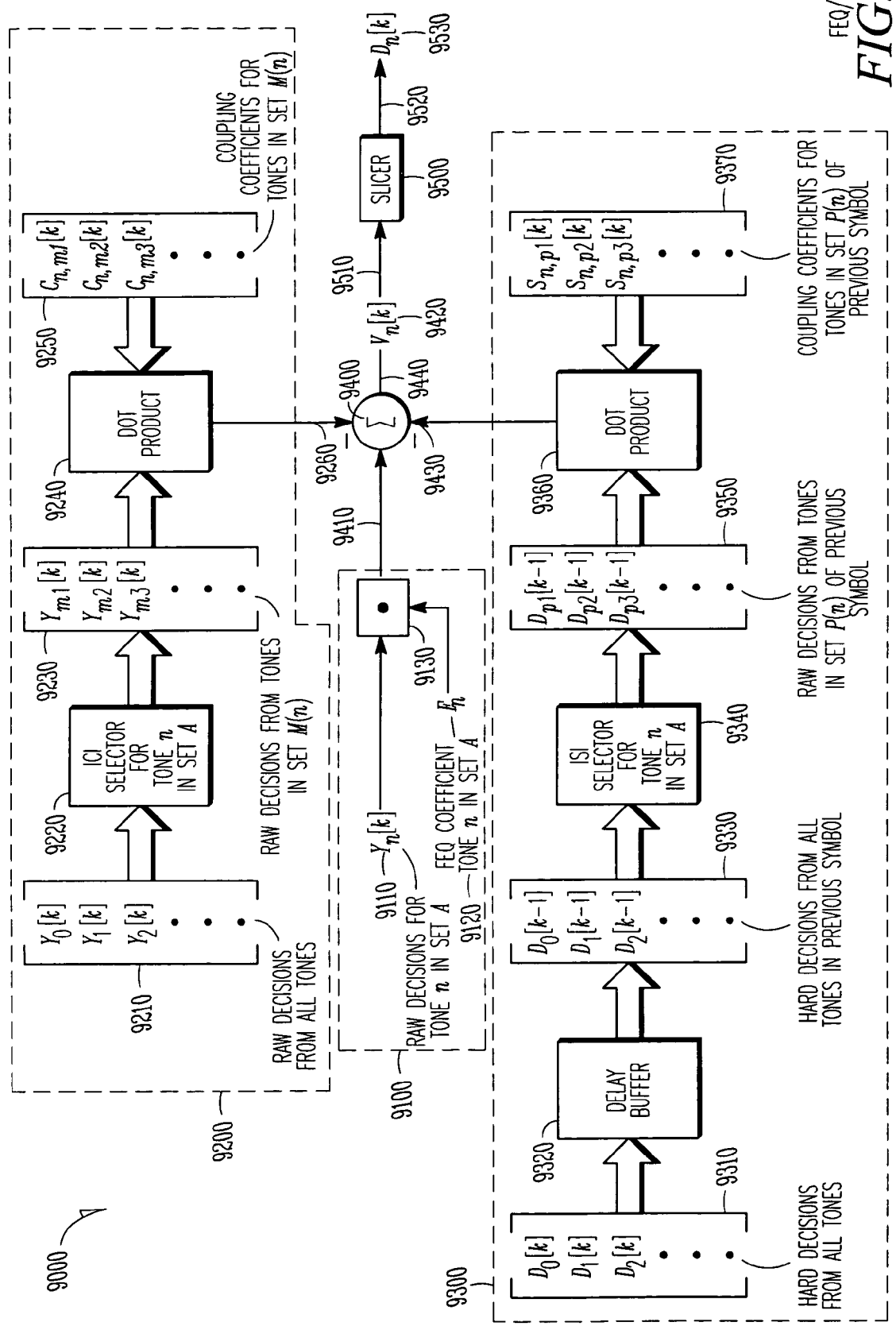
FIG. 9 is a flow chart describing an exemplary method of operation according to some embodiments of the present invention.

FIG. 9 illustrates flow chart describing an exemplary method of operation according to some embodiments of the present invention. At block 9100, raw decisions for tone n in subset A 9110, also referred to as the "affected tones," are provided to dot product block 9130. Raw decisions may be provided for example, by N-Point FFT 2700 of FIG. 7. FEQ coefficient $F_n$ for tone n in subset A 9120 is also provided to dot product block 9130. FEQ coefficient $F_n$ is described in further detail below. Dot product block 9130 provides at output 9410 the dot product of the raw decisions for tone n in subset A 9110 and the FEQ coefficient $F_n$ for tone n in subset A 9120. In various embodiments, the output provided at output 9410 is calculated using Equation 1 as described above.

At block 9200, raw decisions for all tones 9210 are provided to ICI selector for tone n in subset A 9220. ICI selector for tone n in subset A determines a subset of tones, subset M(n), also referred to at "ICI culprit tones for tone n," from which ICI is to be cancelled from the raw decision of tone n. The selected tones are provided in raw decisions from tones in set M(n) block 9230, labeled as $Y_{m1}[k], Y_{m2}[k], Y_{m3}[k] \ldots$, wherein m1, m2, m3, and so on, are indices of tones in subset M(n). The tones in tone block 9230 are provided to dot product block 9240. In addition, coupling coefficients between tone n and tones in subset M(n), labeled $C_{n,m1}[k], C_{n,m2}[k], C_{n,m3}[k] \ldots$ are also provided to dot product block 9240. Coupling coefficients between tone n and tones in subset M(n) are described in more detail below. Dot product block 9240 generates at output 9260 that is the dot product of the raw decisions from tones in subset M(n) 9230 and the coupling coefficients between tones n and tones in subset M(n) 9250.

At block 9300, hard decisions from all tones 9310, labeled $D_0[k], D_1[k], D_2[k] \ldots$, are provided to delay buffer 9320. In various embodiments, hard decisions for all tones 9310 are provided as feedback from the output 9520 of slicer 9500, the output being from a previously received symbol. In addition, hard decisions for all tones 9310 may include hard decisions from a plurality of previously received symbols. In some embodiments, delay buffer 9320 includes memory to store the hard decisions for all tones 9310 from a previous symbol, or a plurality of previous symbols. At tone block 9330, hard decisions for all tones in a previous symbol, labeled $D_0[k-1]$, $D_1[k-1]$, $D_2[k-1]$ ..., are provided to ISI selector for tone n in subset A 9340. ISI selector for tone n in subset A 9340 provides hard decisions from tones in subset P(n) of a previous symbol 9350, labeled $D_{p1}[k-1]$, $D_{p2}[k-1]$, $D_{p3}[k-1]$, ..., to dot product block 9360. In addition, coupling coefficients between tones n of the current symbol and tones in subset P(n) of a previous symbol 9370 are provided to dot product block 9360. Coupling coefficients between tones n and tones in subset P(n) of a previous symbol 9370 are described in more detail below. Dot product block 9360 generates an output at 9430 that is the dot product of hard decisions from tones in subset P(n) of a previous symbol 9350 and the coupling coefficients between tone n and tones in subset P(n) of a previous symbol 9370.

Summer 9400 receives at input 9410 the output from dot product block 9130, receives at input 9260 the output of dot product block 9240, and receives at input 9430 the output from dot product block 9360. Summer 9400 produces a soft decision, labeled $V_n[k]$ at output 9440. In some embodiments, output $V_n[k]$ represents a "soft decision" for tone n of symbol k after performing FEQ, ICI cancellation, and ISI cancellation on tone n. Those of ordinary skill in the art will recognize that a similar output may be generated for each tone n in a plurality of tones present in a particular symbol. In various embodiments, the output provided by summer 9400 is represented by Equation 2 presented above.

The output of summer 9400 is provided to an input 9510 of slicer 9500. Slicer 9500 provides at output 9520 a hard decision 9350, labeled $D_n[k]$, representing a hard decision of a constellation point for tone n of symbol k.

In various embodiments of the present invention, general guidelines for selecting the first subsets of tones, the subset U, "unaffected tones", and for selecting the second subset of tones the subset A, "affected tones" along with general guidelines for selecting the third subset M(n), ICI culprit tones for tone n, and a fourth subset P(n), ISI culprit tones for tone n, for each n of the second, or affected, tones, are described as follows.

In some embodiments, extensive simulation is used to determine which tones have negligible performance degradation due to ISI/ICI and which tones have significant performance degradation due to ISI/ICI. For each of those tones that are determined to have significant ISI/ICI and thus ISI/ICI cancellation is needed, a determination is made selecting a list of tones that are the major contributors of ISI/ICI. In some embodiments, the determination is made again using extensive simulation. In some embodiments, a determination is made of the trade-off between performance enhancement and implementation costs. In various embodiments, the following general guidelines are also used in selecting the subsets of tones:

1.) Interference is usually strongest from those tones that suffer less attenuation from the communication channel. In general, low frequency tones usually cause more interference to other tones than high frequency tones do. This is because low frequency tones usually suffer less attenuation from the communication channel. Since they are stronger in the receiver, their interference to other tones is also stronger.

2.) Interference is usually very strong where the response of the communication channel has a sharp transition in frequency.

3.) The ISI/ICI cancellation is usually needed only for the tones with high SNR (signal-noise ratio). For the tones with low SNR, the ISI/ICI cancellation does not make sense since other sources of impairment, e.g. thermal noises, usually dominate.

4.) The interference from neighboring tones and coupling from and to "empty" tones are usually strongest.

The following example using ADSL is included, not by way of limitation, but to illustrate the use of the general guidelines. However, those of ordinary skill in the art will recognize that the general principles depicted in this example are applicable to all MCM systems.

First, an examination is performed of the frequency response of the communication channel. ADSL utilizing a scheme called FDD (frequency domain duplex) to allow a simultaneous transmission of downstream and upstream traffics over the same pair of transmission lines. Downstream traffic is the signal transmission from central office to the user's premises, while upstream traffic is the signal transmission from the user's premises to central office. FDD makes the simultaneous transmission possible by using two non-overlapping (or slightly over-lapping) frequency bands, one for downstream and one for upstream. For example, downstream traffic uses the frequency range from tone number 40 to tone number 255, while upstream traffic uses the frequency range from tone number 5 to tone number 32. In the receiver of the user's premises equipment, a high pass filter with a cut-off corner around tone number 36 is usually used to separate the downstream signal from the upstream signal that leaks to the receiver from the transmitter of the user's premises equipment. In this case, the frequency domain response of the communication channel for the downstream traffic has a sharp transition around tone number 36. Whenever there is a sharp transition in the frequency response of the communication channel, there is a rich coupling among the tones near the sharp transition. Also, the coupling is usually strongest among neighboring tones and empty tones. In this case, we may select the subset A as $$A=\{40, 41, 42, \ldots, 59\}$$

which correspond to the first twenty that are closest to the abrupt transition and also lowest in frequencies, and the subset U as $$U=\{60, 61, 62, \ldots, 255\}$$

which correspond to the tones that are away from the sharp transition and also high in frequencies (so that SNR are already low and therefore ISI/ICI cancellation does not help significantly).

For each tone n in A, we usually select its image tone, a few neighboring tones along with their images, and a few "empty" tones along with their images for doing ICI cancellation. For example, for tone number 40 (n=40), we may select the subset M(40) as $$M(40)=\{35, 36, 37, 38, 39, 41, 42, \text{N-42, N-41, N-40,}\\ \text{N-39, N-38, N-37, N-36, N-35}\}$$

Here, we select its image (N-40), four neighboring tones (38, 39, 41, 42) along with their images (N-38, N-39, N-41, N-42), and three "empty" tones (35, 36, 37) along with their images (N-35, N-36, N-37). Note that tones number 35, number 36 and number 37 are referred to as "empty" tones because they are not used in either upstream or downstream transmission. They are included in ICI cancellation, however, because there is a sharp transition in the frequency response near these tones and therefore a lot of useful information has been coupled to them. Also, they are low frequency tones that suffer less attenuation from the communication channel and thus are relatively strong in the receiver. Note that the "image" of tone n is tone N−n (N=512 for ADSL.).

The selection of the subset for doing ISI cancellation is similar to that for ICI cancellation. We usually select the same tone n (but from the previous DMT symbol) along with its image, a few neighboring tones along with their images, and a few "empty" tones along with their images for doing ISI cancellation. For example, for tone number 40, we may select the subset M(40) as P(40)={35, 36, 37, 38, 39, 40, 41, 42, N-42, N-41, N-40, N-39, N-38, N-37, N-36, N-35}

Here, we select the same tone (40) along with its image (N-40), four neighboring tones (38, 39, 41, 42) along with their images (N-38, N-39, N-41, N-42), and three "empty" tones (35, 36, 37) along with their images (N-35, N-36, N-37). Note that tones number 35, number 36 and number 37 are referred to as "empty" tones because there are not used in either upstream or downstream transmission. The reason for selecting a few "empty" tones is because they contain rich information coupled to them due to sharp transition of response near them. It is worth pointing out, however, that the previous symbols from decision device are all zero because there was no signal inside. Thus tone number 35, number 36 and number 37 in subset P(40) of the aforementioned example are zero.

Note that the number of neighboring tone selected for either ICI or ISI cancellation can be different from tone to tone. Usually, the tones that are near the sharp transition of the frequency response, or the low frequency tones, need more neighboring tones for performing ICI/ISI cancellation. For example, we may need 4 neighboring tones for tone number 40 in doing ICI/ISI cancellation but only need 2 neighboring tone for tone number 59, since tone number 40 is closer to the transition and suffers more ICI/ISI, and also is higher in SNR thus we gain more from ICI/ISI cancellation.

Following the aforementioned guideline, we can make selection for tones in U, A, M(n), and P(n) once the system duplex scheme, and a general idea about the communication channel are known. Therefore, the selection can always be made upfront can the results can be stored in look-up tables.

The coefficients for FEQ coefficient $F_n$, ICI coupling coefficients $C_{nm}$, and ISI coupling coefficient $S_{np}$, for tone n in subset A are chosen such as to minimize the mean square error between its "soft decision" $V_n[k]$ and "hard decision" $D_n[k]$. The methods for obtaining these coefficients are well known in prior art, for example, by using LMS (least mean square) or RLS (recursive least square). For instance, when using LMS, we adaptively adjust the coefficient $F_n$ using the following recursive formula:

$$F_n^{(k+1)} = F_n^{(k)} + \mu \cdot (D_n[k] - V_n[k])^* \cdot Y_n[k]$$

$$C_{nm}^{(k+1)} = C_{nm}^{(k)} + \mu \cdot (D_n[k] - V_n[k])^* \cdot Y_m[k]$$

$$S_{np}^{(k+1)} = S_{np}^{(k)} + \mu \cdot (D_n[k] - V_n[k])^* \cdot D_p[k-1]$$

for n in A, m in M(n), and p in P(n). Here, the superscript "$(k)$" denotes the current value of the coefficient used for current DMT symbol, the superscript "$(k+1)$" denotes the updated value to be used for next DMT symbol, and $\mu$ is an adaptation constant.

Aforementioned ISI cancellation uses hard decisions generated from a slicer. Sometimes, however, we prefer to use alternative decisions. In some cases, the MCM system has a training phase, during which the receiver readily knows the exact DMT symbols transmitted from the transmitter. In this case, we can use the exact, readily known constellation point for each tone to replace the respective hard decision. Also, some MCM systems use advanced forward error correction schemes (e.g. trellis code modulation) to improve the performance of DMT symbol detection. In this case, we may use the detection results from the corresponding decoder (e.g. Viterbi decoder) to replace the hard decisions.

Thus far we show the scheme for canceling the ISI from the previous DMT symbol. For those skillful in the art, it is straightforward to expand it to cancel the ISI from more than one preceding DMT symbols. In general, to cancel the ISI from symbol (k-p) (p symbols earlier, where p is a positive integer) to symbol k (current symbol) for tone n in A, we first select a subset of tones based on aforementioned rules (sharp transition in frequency response, neighboring tones, empty tones, and so on). When calculating the "soft decision," we need to minus a term obtained from the dot product between the vector formed by the "hard decisions" of tones corresponding to that subset from p DMT symbols earlier and an ISI vector. The ISI vector, of course, depends on the values of p. The coefficients within the ISI vector can also be obtained using the LMS method. In real life, however, it is not necessary to consider ISI for more than one DMT symbols.

In above description, we cancel the coupling from tone m to tone n by subtracting the dot product between the "raw decision" $Y_m[k]$ and the ICI coefficient $C_{nm}$. However, the raw decisions themselves are noisy, and the noises will be passed to tone n when we perform the ICI cancellation. In contrast, "soft decisions" are less noisy than "raw decision," while "hard decisions" are even less noisy than "soft decisions." The "hard decision" from a slicer is usually available once the "soft decision" is available. However, the "advanced hard decision" from say the Viterbi decoder mentioned above may not always be available. As long as parts of the "soft decisions" or even "hard decisions" are readily available for current DMT symbol, we may use them for ICI cancellation. For instance, we first perform FEQ/IC for tone #40. At that time, none of the soft/hard decision are available, therefore we have to use "raw decisions" exclusively. After FEQ/IC is done for tone #40, the soft/hard decision for tone #40 becomes available. Therefore, from now when we want to cancel the ICI from tone #40, we should use the soft/hard decision instead of the raw decision from tone #40. The coupling coefficient between the soft/hard decision of the culprit tone and the victim tone, however, is different from the coupling coefficient between the raw decision of the culprit tone and the victim tone. Fortunately, they are proportional to each other, and the proportional constant is indeed the FEQ coefficient of the culprit tone. For every tone n in A, we identify a list of tones of which the soft/hard decisions are readily available by the time we perform the FEQ/IC for this tone. Let the indices of those tones form a subset Q(n). Then we have the improved method for FEQ/IC expressed mathematically as $$V_n[k] = Y_n[k] \cdot F_n^* - \sum_{q \in Q(n)} D_q[k] \cdot C_{nq}^* - \sum_{m \in M(n)-Q(n)} Y_m[k] \cdot C_{nm}^* - \sum_{p \in P(n)} D_p[k-1] \cdot S_{np}^*, \quad \text{Equation 3}$$

$$\text{for } n \in A$$

Or, in English, we describe the improved algorithm as meaning that the "soft decision" for tone n in subset A, which contains the tones of interest that have non negligible ISI/ICI, is obtained by calculating the dot product between the "raw decision" and the FEQ coefficient of tone n, minus the dot product between the vector formed by the "hard decisions" (or "soft decisions" if "hard decisions" are not available) corresponding to the tones in subset Q(n) and an ICI vector, minus the dot product between the vector formed by the "raw decisions" corresponding to the tones in subset M(n) but not in subset Q(n) and an ICI vector, minus the dot product between the vector formed by the "hard decisions" corresponding to the tones in subset P(n) from the previous DMT symbol and an ISI vector.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of receiving multi-carrier data, the method comprising:
    receiving a sequence of blocks of frequency domain data comprising N elements, each representing the modulation onto a certain sub-carrier;
    selecting a first subset U among the N elements and performing frequency-domain equalization for each element u in U; and
    selecting a second subset A among the N elements performing both frequency-domain equalization and interference cancellation for each element a in A;
    wherein performing frequency-domain equalization includes multiplying each of the N elements with a respective equalization coefficient; and
    wherein performing interference cancellation for each element a in subset A further comprises:
        selecting a third subset M and performing inter-carrier interference cancellation for removing the interference caused to element a by the elements in M in current time instant; and
        selecting a fourth subset P and performing inter-symbol interference cancellation for removing the interference caused to element a by the elements in P in previous time instants.

2. The method of claim 1, wherein performing the inter-carrier interference cancellation further comprises:
    multiplying each of the elements in M with a respective inter-carrier coupling coefficient;
    summing all the multiplication products; and
    subtracting the summing result from element a.

3. The method of claim 2, wherein performing the inter-symbol interference cancellation further comprises:
    multiplying each of the elements in P with a respective inter-carrier coupling coefficient;
    summing all the multiplication products; and
    subtracting the summing result from element a.

4. The method of claim 1, wherein performing frequency domain equalization further comprises:
    making a most likely decision on the element after performing frequency domain equalization or both frequency domain equalization and interference cancellation;
    calculating the difference between the most likely decision and the element after equalization or both equalization and cancellation; and
    using the difference to adapt the equalization coefficient to minimize the difference.

5. The method of claim 1, wherein performing inter-carrier interference further comprises:
    making a most likely decision on the element after performing both frequency domain equalization and interference cancellation;
    calculating the difference between the most likely decision and the element after equalization and cancellation; and
    using the difference to adapt the inter-carrier coupling coefficient to minimize the difference.

6. The method of claim 2, wherein performing inter-symbol interference further comprises:
    making a most likely decision on the element after performing both frequency domain equalization and interference cancellation;
    calculating the difference between the most likely decision and the element after equalization and cancellation; and
    using the difference to adapt the inter-symbol coupling coefficient to minimize the difference.

7. A device comprising:
    a receiver including a frequency domain equalizer/interference canceller, the frequency domain equalizer/interference canceller including an input, a tone selector, and an output;
    the input adapted to receive a discrete multi-tone signal including a plurality of tones;
    the tone selector adapted to generate a first subset of tones that have negligible inter-carrier interference and negligible inter-symbol interference, and a second subset of tones that have significant inter-carrier interference and significant inter-symbol interference;
    and the output adapted to provide a soft decision for each of a first subset of the plurality of tones and a soft decision for each of a second subset of the plurality of tones;
    wherein the frequency domain equalizer/interference canceller is adapted to:
    receive a sequence of blocks of frequency domain data comprising N elements, each representing the modulation onto a certain sub-carrier;
    select a first subset U among the N elements and perform a frequency-domain equalization for each element u in U;

select a second subset A among the N elements and perform both frequency-domain equalization and interference cancellation for each element a in A;

perform frequency-domain equalization including multiplying the each of the N elements with a respective equalization coefficient;

select a third subset M and perform inter-carrier interference cancellation to remove the interference caused to element a by the elements in M in current time instant; and select a fourth subset P and perform inter-symbol interference cancellation to remove the interference caused to element a by the elements in P in previous time instants.

8. The device of claim 7, further including a decision device coupled to the output of the frequency domain equalizer/interference canceller, the decision device adapted to generate a set of most likely constellation points, said hard decisions from the soft decision of each of the first subset and the second subset of the plurality of tones.

9. The device of claim 8, further including a feedback loop coupling an output of the decision device with a feedback input of the frequency domain equalizer/interference canceller, the feedback loop adapted to provide the frequency domain equalizer/interference canceller with a set of hard decisions generated by the decision device from the soft decision for each of the second subset of the plurality of tones.

10. The device of claim 9, wherein the frequency domain equalizer/interference canceller is adapted to generate a soft decision for each of the second subset of tones based on the hard decisions provided at the feedback input.

11. The device of claim 7, further including a memory coupled to the frequency domain equalizer/interference canceller, adapted to store hard decisions from one or more discrete multi-tone symbols known to be transmitted from a transmitter.

12. The device of claim 11, wherein the frequency domain equalizer/interference canceller is adapted to generate a soft decision for each tone in the second subset of tones based on the hard decision generated for each tone of a discrete multi-tone symbol stored in the memory.

13. The device of claim 8, further including a decoder coupled to the frequency domain equalizer/interference canceller, the decoder adapted to perform forward error correction on the output of the frequency domain equalizer/interference and generate an alternative hard decision for each of the first subset and the second subset of the plurality of tones.

14. The device of claim 13, further including a feedback loop coupling an output of the decoder with a feedback input of the frequency domain equalizer/interference canceller, the feedback loop adapted to provide the frequency domain equalizer/interference canceller with a set of alternative hard decisions generated by the decoder for each of the first subset and the second subset of the plurality of tones.

15. A system comprising:

a transmitter adapted to generate a multi-carrier modulation signal, the signal including a plurality of tones utilized to transmit information;

a communication channel having a frequency response coupled to the transmitter, the communication channel adapted to transmit the multi-carrier modulation signal generated by the transmitter; and a receiver including a frequency domain equalizer/interference canceller;

wherein the frequency domain equalizer/interference canceller is adapted to:

receive a first set of frequency domain samples, and to determine from the plurality of tones a first subset of tones that are close to being orthogonal to one another under the influence of the communication channel and a second subset of tones that are far from being orthogonal to one another under the influence of the communication channel, receive a sequence of blocks of frequency domain data comprising N elements, each representing the modulation onto a certain sub-carrier;

select a first subset U among the N elements and perform a frequency-domain equalization for each element u in U;

select a second subset A among the N elements and perform both frequency-domain equalization and interference cancellation for each element a in A;

perform frequency-domain equalization including multiplying the each of the N elements with a respective equalization coefficient;

select a third subset M and perform inter-carrier interference cancellation to remove the interference caused to element a by the elements in M in current time instant; and select a fourth subset P and perform inter-symbol interference cancellation to remove the interference caused to element a by the elements in P in previous time instants.

16. The system of claim 15, wherein the first subset of tones includes tones that are at least a number of tones away from the transition band between two non-overlapping frequency bands or a transition edge in the frequency response of the communication channel.

17. The system of claim 15, wherein the second subset of tones includes one or more tones that are closest to the transition band between two non-overlapping frequency bands or a transition edge in the frequency response of the communication channel.

18. The system of claim 15 further including a decision device coupled to the output of the frequency domain equalizer/interference canceller, the decision device adapted to receive a soft decision regarding a constellation point for each of the tones in the first set of tones, and a soft decision regarding a constellation point for each of the tones in the second subset of tones.

19. The system of claim 18, wherein the decision device is further adapted to generate a hard decision regarding the a most likely constellation point for each of the tones in the first set of tones, and a hard decision regarding a most likely constellation point for each of the tones in the second subset of tones.

20. The system of claim 19, wherein the frequency domain equalizer/interference canceller processes each of the tones in the first subset by multiplying the frequency domain sample of each tone with an equalization constant.

21. The system of claim 19, wherein the frequency domain equalizer/interference canceller processes each of the tones in the second subset by multiplying the frequency domain sample of each tone with an equalization constant and subtracting from a multiplication product of the second subset a coupling from each of other tones in the second subset.

22. The system of claim 21, wherein the coupling from each of other tones in the second subset, said the coupling from tone X to tone Y in the second subset is a multiplication product between an coupling coefficient and the frequency domain data for tone X, or the soft decision for tone X, or the hard decision for tone X.

* * * * *

UNITED STATES PATENT AND TRADEMARK OFFICE
CERTIFICATE OF CORRECTION

PATENT NO. : 7,693,225 B2
APPLICATION NO. : 11/256707
DATED : April 6, 2010
INVENTOR(S) : Chia-Liang Lin et al.

It is certified that error appears in the above-identified patent and that said Letters Patent is hereby corrected as shown below:

Title Page;
On the face page, in field (73), in "Assignee", in column 1, line 1, delete "Corp." and insert -- Corp., --, therefor.

On the face page, in field (56), under "Other Publications", in column 2, line 2, delete "Transaactions" and insert -- Transactions --, therefor.

On the face page, in field (57), under "Abstract", in column 2, line 2, delete "plurality" and insert -- plurality of --, therefor.

In column 16, line 44, in Claim 19, delete "the a" and insert -- a --, therefor.

Signed and Sealed this

Eighth Day of June, 2010

David J. Kappos
*Director of the United States Patent and Trademark Office*